US008235421B2

(12) United States Patent
Biscan

(10) Patent No.: US 8,235,421 B2
(45) **Date of Patent: *Aug. 7, 2012**

(54) TRANSPORT FRAME

(76) Inventor: Philip Biscan, Goshen, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/915,612

(22) Filed: Oct. 29, 2010

(65) Prior Publication Data

US 2011/0042930 A1 Feb. 24, 2011

Related U.S. Application Data

(63) Continuation of application No. 11/729,738, filed on Mar. 29, 2007, now Pat. No. 7,828,329.

(60) Provisional application No. 60/810,040, filed on Jun. 1, 2006.

(51) Int. Cl.
*B62D 21/00* (2006.01)

(52) U.S. Cl. ........ 280/781; 280/785; 280/789; 280/795; 280/797

(58) Field of Classification Search .................. 280/781, 280/785, 789, 795, 797, 799, 796
See application file for complete search history.

(56) References Cited

U.S. PATENT DOCUMENTS 3,338,203 A * 8/1967 Moore .......................... 114/271
3,443,776 A * 5/1969 Moore .............................. 244/5
3,559,923 A * 2/1971 Moore ....................... 244/17.11
3,575,251 A * 4/1971 Moore .......................... 180/219
3,881,566 A * 5/1975 Moore .......................... 180/219
3,884,521 A 5/1975 Moore
4,014,401 A * 3/1977 Moore ............................ 180/22
4,534,589 A 8/1985 Booher
4,742,899 A 5/1988 Thornton
5,474,331 A 12/1995 Booher
5,555,699 A 9/1996 Borthick et al.
5,653,494 A 8/1997 Cleall et al.
6,003,935 A 12/1999 Kalazny
6,010,182 A 1/2000 Townsend
6,109,684 A 8/2000 Reitnouer
6,302,478 B1 10/2001 Jaekel et al.
6,367,391 B1 4/2002 Thoman et al.
6,623,067 B2 9/2003 Gabbianelli et al.
6,681,489 B1 1/2004 Fleming
6,749,252 B2 6/2004 Cervenka
6,896,320 B2 5/2005 Kropfeld
6,920,721 B2 7/2005 Johns et al.
7,000,978 B1 2/2006 Messano
7,144,040 B2 12/2006 Kiehl et al.
7,191,567 B2 3/2007 Brandt et al.
7,325,866 B2 2/2008 Horton et al.
7,422,272 B2 9/2008 Horton et al.
2002/0163173 A1 11/2002 Ruehl et al.

FOREIGN PATENT DOCUMENTS

FR 2557045 6/1985

* cited by examiner

*Primary Examiner* — Toan To
(74) *Attorney, Agent, or Firm* — Warner Norcross & Judd LLP

(57) ABSTRACT

A transport frame includes a plurality of beams interconnected to form the frame with a first group of the beams intersecting and extending through a second group of the beams. The first group of the beams is secured to the second group of beams at their respective intersections. At least one of the beams comprises a polymer beam.

16 Claims, 9 Drawing Sheets

TRANSPORT FRAME

This application is a continuation of U.S. pending application Ser. No. 11/729,738, filed Mar. 28, 2007, entitled TRANSPORT APPARATUS by Applicant Philip Biscan, which claims priority from U.S. provisional application Ser. No. 60/810,040, filed Jun. 1, 2006, entitled TRANSPORT FRAME, by Applicant Philip Biscan, which are incorporated by reference herein in their entireties.

TECHNICAL FIELD AND BACKGROUND OF THE INVENTION

The present invention generally relates to a frame and, more particularly, to a frame that is particularly suitable for use as a platform for motor homes or a wheeled frame for trailers, such as travel or cargo trailers and fifth wheels or the like.

In conventional frames for trailers, the frames are typically formed from metal components with the floor of the trailer bolted on top of the frame. For example, in a travel trailer, the side walls are then mounted to the floor. Further, the frames of conventional trailers tend to be heavy and, therefore, require significant energy to pull. The frames that form platforms in a motor home are similarly formed from metal components, with the floor or decking mounted on top of the frame using conventional fastening mechanisms. Again, these frames comprise a significant portion of a motor home's weight. Similar weight considerations affect watercraft and watercraft trailers. Consequently, with the more recent increase in gasoline costs the cost to tow a trailer or drive a motor home, or operate a motor boat, has been significant and in some cases cost prohibitive.

Accordingly, there is a need for a frame that can be used for a trailer or as a platform in a motor home that will reduce the weight of the trailer or the motor home while still providing the necessary rigidity to function safely.

SUMMARY OF THE INVENTION

Accordingly, the present invention provides a frame that is rigid and yet light weight and, further, optionally is assembled from one or more polymer members, which reduces, if not eliminates corrosion. Further, when made from one or more polymer members, the polymer member may provide one or more non-conductive raceways for routing electrical wires or cables through the frame.

In one form of the invention, a transport frame includes a plurality of polymer beams interconnected to form the frame. A first group of the polymer beams intersect and extend through a second group of the polymer beams and are secured thereto by an adhesive at their respective intersections. In addition, at least one of the polymer beams provides a non-conductive raceway for routing electrical wires or cables through the frame.

In one aspect, the first group of polymer beams are tubular. In another aspect, the second group of polymer beams include webs with the first group of beams intersecting and extending through the webs of the second group of polymer beams. In addition, the first group of polymer beams are preferably secured to the webs of the second group of polymer beams with an adhesive.

In a further aspect, the beams are interrelated by decking material so that the beams form a floor with the decking material.

In another form of the invention, a chassis frame includes first and second longitudinal polymer beams oriented generally parallel to and spaced apart from a central axis. Each of the beams has a vertically oriented web facing the central axis and has forward and rearward ends. The frame further includes a plurality of transverse polymer beams. The transverse polymer beams are spaced apart and are generally orthogonal to the central axis. The transverse polymer beams form intermediate transverse polymer beams and a forward transverse polymer beam, with the intermediate transverse polymer beams extending through transverse openings of the webs of the longitudinal polymer beams and being secured to the longitudinal polymer beams in the webs of the longitudinal beams at the openings. The forward transverse polymer beam extends across and connects to the forward ends of the longitudinal polymer beams. In addition, an A-shaped frame extends from the forward transverse beam for mounting a towing hitch to the frame.

In one aspect, at least one of the polymer beams forms a non-conduct raceway for electrical wires or cables.

In another aspect, the polymer beams may comprise reinforced polymer beams. Further, the polymer beams may comprise polymer I-beams or tubular polymer beams.

In another aspect, the forward transverse polymer beam includes a web facing the intermediate transverse polymer beams, and the A-shaped frame includes two angled beams extending through the web of the forward transverse polymer beam. In addition, the A-shaped frame may include an intermediate beam between the angled beams, which also extends through the web of the forward transverse polymer beam.

In preferred form, the beams of the A-shaped frame also comprise polymer beams.

According to yet another aspect, each of the first and second longitudinal beams provides a mounting surface for an axle mount.

In yet other aspects, the frame included second and third pairs of longitudinal polymer beams that are oriented generally parallel to and spaced apart from the central axis and from the first pair of longitudinal polymer beams. For example, each of the second and third pair of longitudinal polymer beams may have forward and rearward ends, with the rearward ends of the second pair of longitudinal polymer beams being spaced from the forward ends of the third pair of longitudinal polymer beams to thereby define a wheel well therebetween.

In yet another aspect, each of the intermediate transverse polymer beams has an outer dimension, with each of the transverse openings of the webs of the longitudinal polymer beams having an inner dimension greater than the outer dimension of the intermediate transverse polymer beams wherein the transverse openings provide a gap between the intermediate transverse polymer beams and the webs of the longitudinal polymer beams. In addition, an adhesive is located in the gap for securing the intermediate transverse polymer beams to the webs of the longitudinal polymer beams at the openings.

In accordance with another aspect, the lower surface of the frame is free of any projections extending below the frame. In addition, the frame may include decking material between the beams which together with the beams forms a floor.

According to another form of the invention, a frame includes first and second longitudinal beams oriented generally parallel to and spaced apart from a central axis. Each of the beams has a vertically oriented web facing the central axis and has forward and rearward ends. The frame also includes a plurality of transverse beams, which are spaced apart and generally orthogonal to the central axis. The transverse beams include intermediate transverse beams and a forward transverse beam, with the intermediate transverse beams extending through the webs of the longitudinal beams and being secured to the longitudinal beams at their webs. The forward transverse beam extends across and connects to the forward ends of the longitudinal beams.

In a further aspect, a hitch frame extends from the forward transverse beam for mounting a towing hitch to the frame. For example the hitch frame may comprise an A-shaped frame. In addition, the A-shaped frame includes two angled beams that extends through the web of the forward transverse beam. The A-shaped frame may optionally include an intermediate beam between the angled beams, which extends through the web of the forward transverse beam. The angled beams of the A-shaped frame may be secured to the longitudinal beams.

In other aspects, the transverse beams comprise polymer beams, such as reinforced polymer beams, such as reinforced polyurethane beams, including pultruded reinforced polyurethane beams.

In other aspects, each of the first and second longitudinal beams provides a mounting surface for an axle mount. Optionally, the frame includes a second pair and a third pair of longitudinal beams oriented generally parallel to and spaced apart from the central axis and from the first pair of longitudinal beams. Each beam of the second and third pair of longitudinal beams has a vertically oriented web facing the central axis and facing the first pair of longitudinal beams. In a further aspect, the rearward ends of the second pair of longitudinal beams are spaced from the forward ends of the third pair of longitudinal beams to thereby define a wheel well therebetween.

According to yet another form of the invention, a chassis frame includes a first pair of longitudinal beams oriented generally parallel to and spaced apart from a central axis and second and third pairs of longitudinal beams oriented generally parallel to and spaced apart from the central axis and from the first pair of longitudinal beams. Each of the longitudinal beams has a vertically oriented web facing the central axis and forward and rearward ends. The frame further includes a plurality of transverse beams, which are spaced apart and generally orthogonal to the central axis. The transverse beams includes intermediate transverse beams and a forward transverse beam. The intermediate transverse beams extend through the webs of the first pair of longitudinal beams and are secured to the first pair of longitudinal beams in the webs of the first pair of longitudinal beams. The forward transverse beam extends across and connects to the forward ends of the first and second pairs of the longitudinal beams. A first group of the intermediate transverse beams is secured to the second pair of longitudinal beams. A second group of the intermediate transverse beams is secured to the third pair of longitudinal beams. An A-shaped frame extends from the forward transverse beam for mounting a towing hitch to the frame. Further, the longitudinal beams, the transverse beams, or the members forming the V-shaped frame comprise polymer beams.

In other aspects, one or more of the beams may form a non-conductive raceway for routing electrical wiring or cables through the frame.

Accordingly, the frame of the present invention provides a rigid but light weight frame that can be used as a platform or decking or a wheeled frame.

These and other objects, advantages, purposes, and features of the invention will become more apparent from the study of the following description taken in conjunction with the drawings.

DETAILED DESCRIPTION OF THE DRAWINGS

DETAILED DESCRIPTION OF THE PREFERRED EMBODIMENTS

Figure 1:
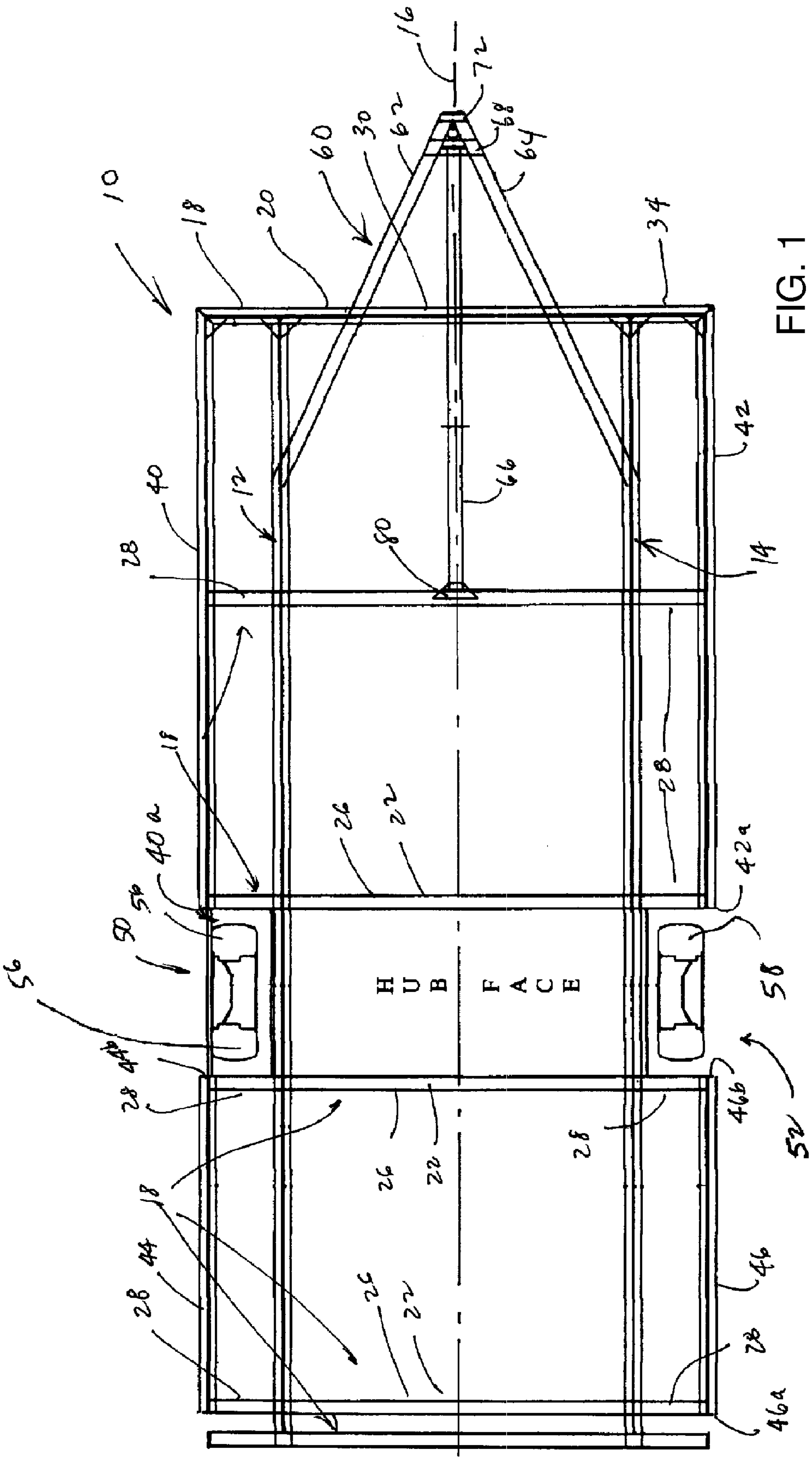
FIG. 1 is a plan view of the frame of the present invention configured as a wheel frame.
Figure 2:
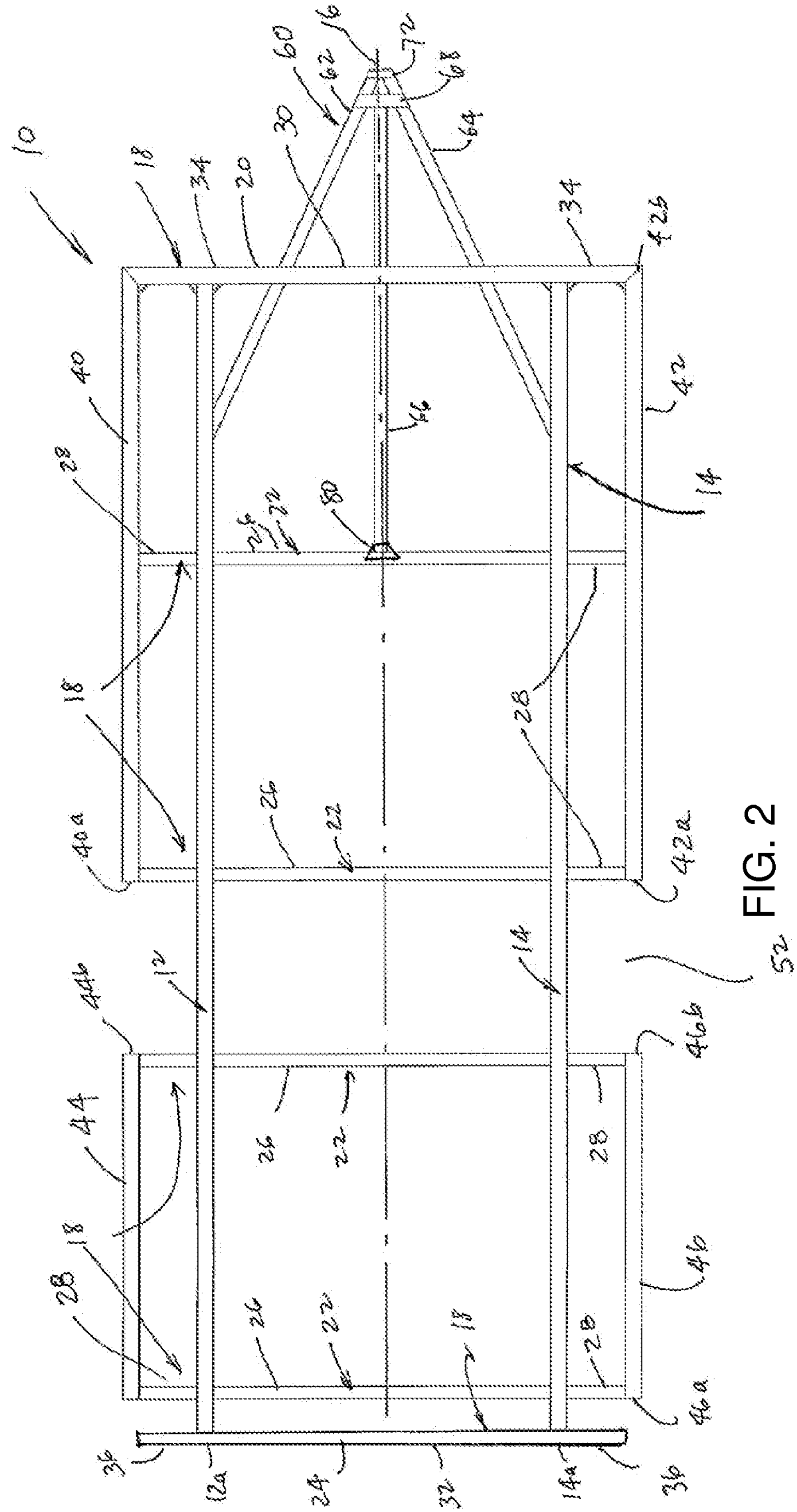
FIG. 2 is a similar view to FIG. 1 with the wheels removed for clarity.

Referring to FIG. 1, the numeral 10 generally designates a frame of the present invention. As will be more fully described below, frame 10 is particularly suitable for use as a wheeled frame for a trailer, such as a travel trailer, a cargo trailer, boat trailer, or a fifth wheel application, or for use as a platform in a motor home or even manufactured housing. In addition, frame 10 is optionally and preferably configured to reduce the weight of the frame and yet provide a rigid durable frame that can withstand the loading necessary to support and, further, form part of floor of a trailer, for example. In addition, frame 10 is formed from one or more polymer beams that form a non-conductive raceway for routing electrical wiring or cable through the frame.

As best seen in FIGS. 1, 2, 4, 5, and 7, frame 10 is formed from a plurality of beams that are interconnected, with one group of beams intersecting and extending through another group of beams, which provides an extremely rigid interconnection of the beams. In the illustrated embodiment, each beam is formed from a polymer material. Further, the beams are interconnected in a manner to provide the necessary strength and rigidity to form a rigid frame and, optionally, as will be more fully described below, to form a floor of a trailer or a platform. For example, depending on the size of the frame, the frame weight may be reduced on the order of 50% or less of a comparable conventional frame that is assembled from metal members. For example, a conventional trailer, which may weigh on the order of 2,000 pounds may be reduced to 400 to 500 pounds with the frame and floor of the present invention. While described as being assembled from only polymer beams, it should be understood that selected beams may be alternately be formed from metal so that the frame is formed from a combination of metal and polymer materials; though, in order to achieve the full benefits of the present invention, it may be preferable to form each of the beams from a polymer material. Suitable polymer beams include reinforced polyurethane beams, such as fiberglass reinforced polyurethane beams, including beams formed from pultrusion.

Referring to again to FIGS. 1 and 2, frame 10 includes a first set of longitudinal beams 12 and 14, which are arranged generally parallel to and spaced apart from a central longitudinal axis 16 of frame 10. Longitudinal beams 12 and 14 are interconnected by a plurality of transverse beams 18. Transverse beams 18 includes a forward transverse beam 20 and intermediate transverse beams 22 and an optional rearward transverse beam 24. Beams 22 form cross members 26, which are supported between longitudinal beams 12 and 14, and outrigger members 28, which project and extend through beams 12 and 14. Similarly beams 20 and 24 form cross-members 30 and 32 and outrigger members 34 and cantilevered portions 36.

In addition, in a wheeled frame application frame 10 includes second and third pairs of longitudinal beams 40, 42 and 44, 46. Longitudinal beams 40 and 42 connect to the ends of forward transverse beam 20 and, in the illustrated embodiment, to two of the intermediate transverse beams 22 to thereby interconnect the forward outrigger members 28. Longitudinal beams 44 and 46 connect to the ends of the two rearward transverse beams 22 to thereby interconnect the rearward outrigger members 28. Further, rearward ends 40*a* and 42*a* of longitudinal beams 40 and 42 are spaced from forward ends 44*b* and 46*b* of longitudinal beams 44 and 46 to thereby provide a space for a wheel well 50 and 52 where wheels 54 and 56 (FIG. 1) may be positioned and supported by axle mounts, described more fully below. The rearward ends 12*a* and 14*a* of longitudinal beams 12 and 14 are interconnected by transverse beam 24 to thereby form a bumper or bumper mount for frame 10.

Figure 8:
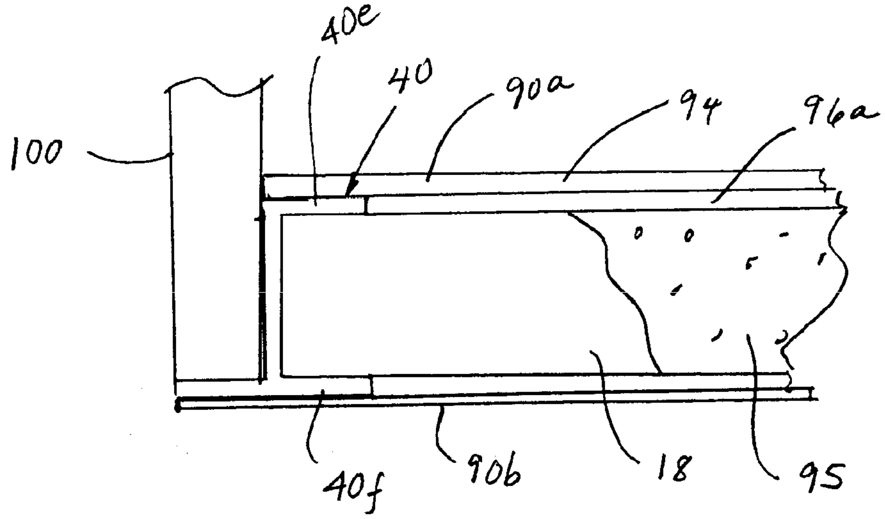
FIG. 8 is an enlarged view of the connection between one outer longitudinal member and a side wall.

Mounted to the opposed end of frame 10 is a hitch frame 60, which is also optionally formed from polymeric beams. In the illustrated embodiment, frame 60 is formed by two angled beams 62 and 64, which extend through forward transverse beam 20 and are mounted to longitudinal beams 12 and 14 between forward transverse beam 20 and intermediate transverse beams 22. In addition, frame 60 includes a longitudinal beam 66 intermediate angled beams 62 and 64, which similarly extends through forward transverse beam 20 and is mounted to the forward-most transverse beam 22. As best seen in FIG. 8, the forward ends of angled beams 62 and 64 are interconnected by upper and lower plate members 68 and 70 and, further, by a channel-shaped member 72, which mounts to the distal ends of angled beams 62 and 64. Upper plate member 68 provides a mounting surface for a hitch coupler. Beams 62, 64, and 66 are illustrated as tubular polymer beams; however, it should be understood that the beams may be formed from other polymer beams with different cross-sections. Further, one or more of beams 62, 64, and 66 may be reinforced by, for example, metal tubes or rods that extend through the respective beams, which tend to exhibit the highest stress in frame 10.

Figure 4:
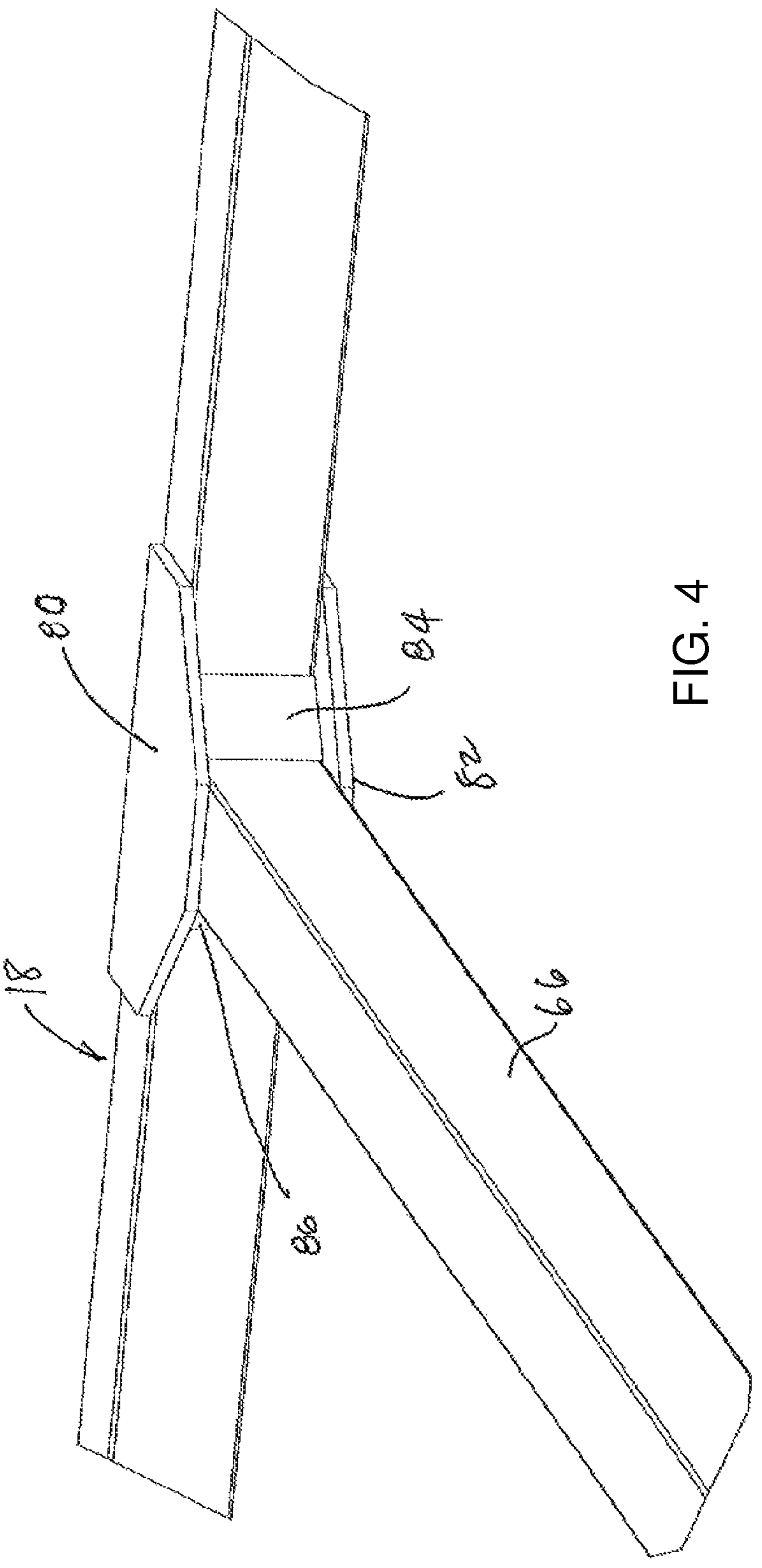
FIG. 4 is an enlarged perspective view of detail of the frame.
Figure 5:
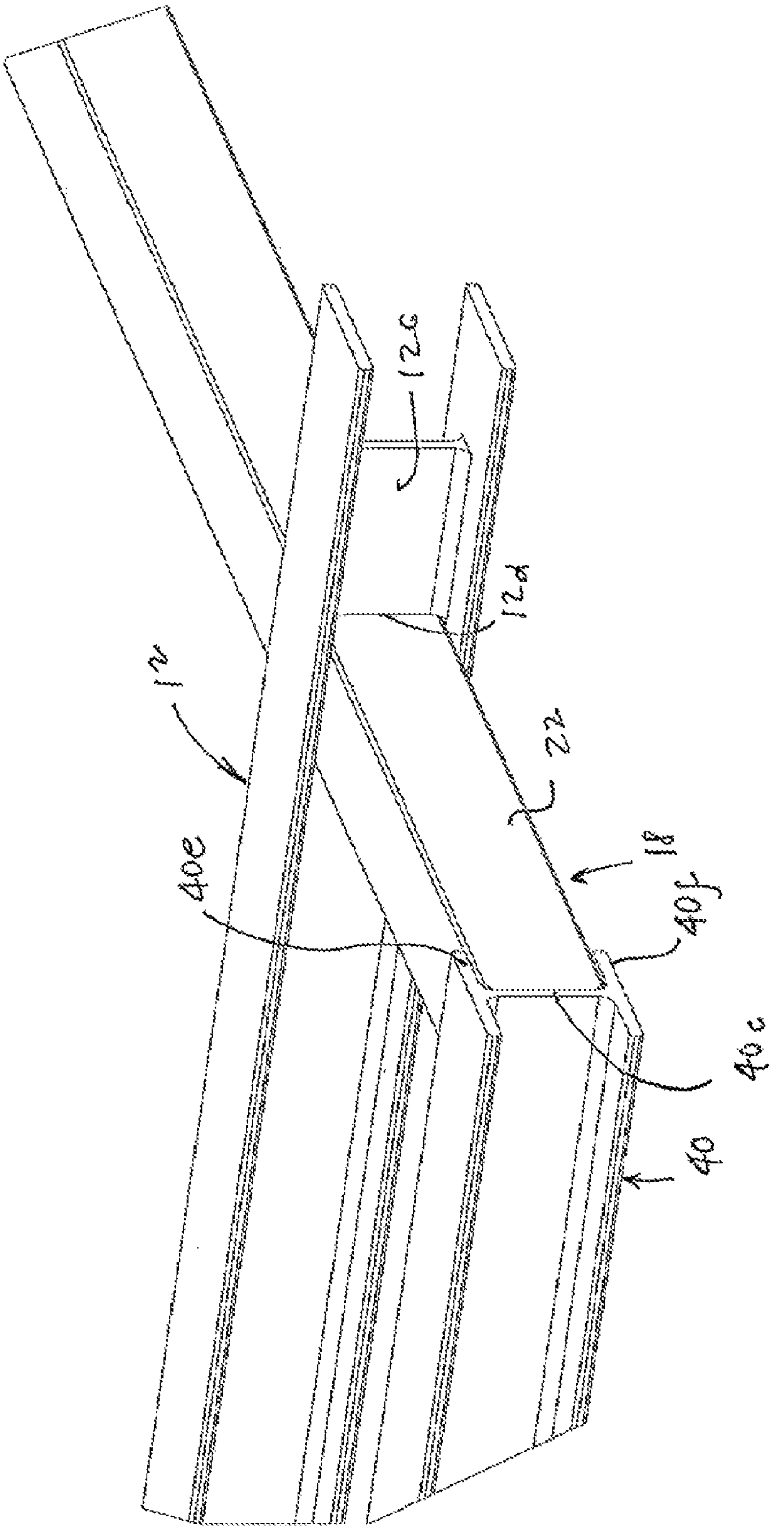
FIG. 5 is an enlarged detailed view of the connection between the rearward transverse beam and the longitudinal beams of the frame.

Referring to FIGS. 4-7, in the illustrated embodiment longitudinal beams 12, 14, 40, 42, 44, and 46 comprise I-beams, and transverse beams 22 comprise tubular members. Though it should be understood that beams with other cross-sections may be used. For example, both sets of beams may be formed from I-beams, or both sets may be formed from tubular members. Similarly, the beams may comprise channel-shaped beams. As best seen in FIG. 5, intermediate transverse beams 22 extend through the respective web portions 12*c* and 14*c* of beams 12 and 14, which are provided with transverse openings 12*d* and 14*d*. Optionally, openings 12*d* and 14*d* are larger than the outer dimensions of the transverse beams to provide a gap between the respective beams to receive an adhesive, more fully described below.

The distal ends of the outrigger members 28 of intermediate beams 22 are mounted between the respective flanges 40*e* and 40*f* of beam 40 and flanges 42*e* and 42*f* of beam 42. Similarly, the rearward transverse intermediate beams are mounted between the respective flanges 44*e*, 44*f*, 46*e*, 46*f* of longitudinal beams 44 and 46, respectively. In these connections, the adhesive is preferably applied between their respective flanges and the upper and lower web walls of the tubular transverse beams and optionally between the web 40*c* and 42*c* of longitudinal beams 40 and 42.

As best seen in FIG. 4, angled beams 62, 64 and intermediate beam 66 similarly extend through the webs of forward transverse member 20, which comprises an I-beam similar to the longitudinal beams. The ends of the respective angled beams 62 and 64 are mounted between the respective flanges 12*e*, 12*f*, 14*e*, and 14*f* of longitudinal beams 12 and 14, respectively, in a similar manner to the ends of the respective transverse beams. Referring again to FIG. 4, intermediate beam 66 is mounted to transverse beam. 22 by a pair of gusset plates 80 and 82 and wedges 84 and 86, which are each secured to the respective surfaces of the beams by an adhesive.

Figure 3:
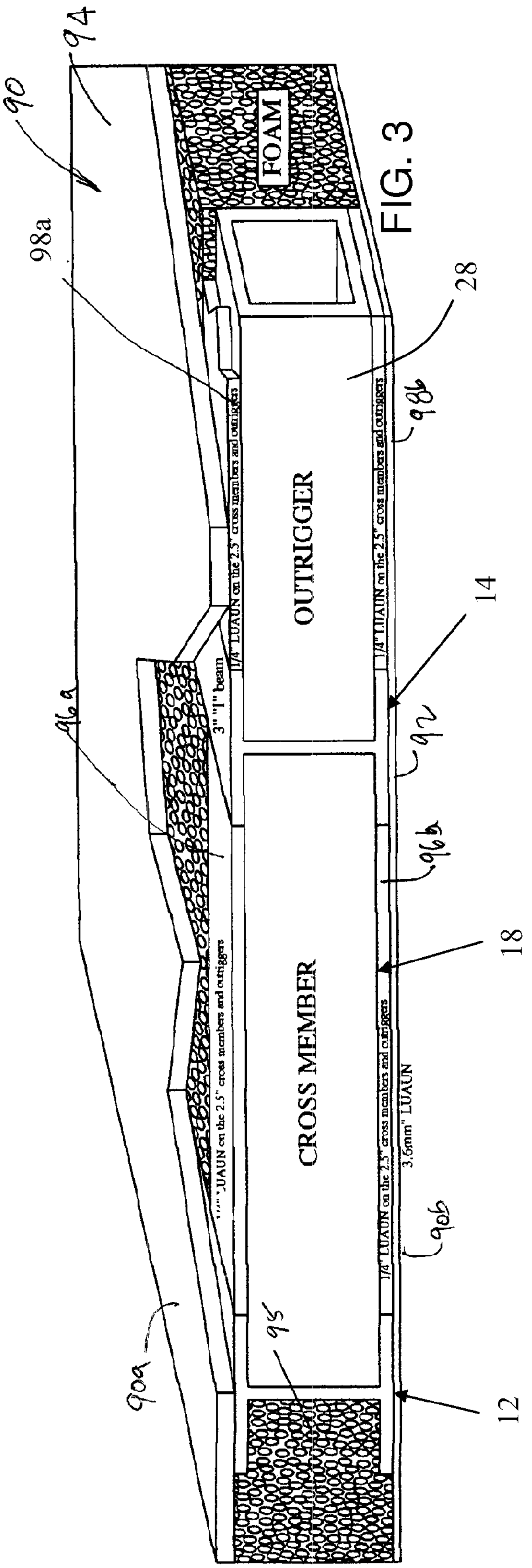
FIG. 3 is a cross-section view taken along line of FIG. 3.

As noted above, the chassis frame of the present invention allows the floor of a trailer to be incorporated into the frame, which forms an integral part of the flooring. Referring to FIG. 3, a floor 90 is formed from a lower plate or sheet 92, which is adhered to the lower flanges of the respective longitudinal beams by an adhesive and by an upper sheet or sheets 94 that are similarly mounted to the upper flanges of the longitudinal beams also by an adhesive. Referring again to FIG. 3, sandwiched between the upper and lower plates or sheets is a foam layer 95, which may be notched to fit inside of the respective longitudinal beams. In addition, each of the respective cross members and outrigger members of the transverse beams 18 includes upper and lower spacer sheets or plates 96*a*, 96*b* and 98*a*, 98*b* to provide a generally contiguous surface with the surfaces of the respective upper and lower flanges of beams 12 and 14. For example, sheets 92, 94, 96*a*, 96*b*, 98*a*, and 98*b* may be formed from a wood material such as luaun. In this manner, the frame forms and is an integral part of the floor. Consequently, the overall height of the frame/floor can be reduced over conventional frames and floors, which typically sit on the frame.

As noted above, the longitudinal beams include transverse openings for receiving the respective transverse beams. As noted above, these openings are optionally sized greater than the outer dimensions of the transverse beams. During assembly of the frame, the intermediate transverse beams are extended through the longitudinal beams and the adhesive is directed into the transverse openings in the gaps formed between the webs of the longitudinal beams and the intermediate transverse members so that the intermediate transverse members are secured to the longitudinal beams at their respective webs. For example, the longitudinal beams may include small transverse openings to provide gates for delivering the adhesive between the intermediate transverse beams and the webs of the longitudinal beams.

As previously noted, each of the respective beams and components forming frame 10 may be formed from a polymer, for example a reinforced polymer. Suitable reinforced polymers include pultruded fiber reinforced polyurethane, which is available from Creative Pultrusions of Pa. However, as noted above, frame 10 may be formed from a combination of metal and polymer components. In addition, frame 10 may be reinforced. For example, as noted above, hitch frame 60, where the stresses would be expected to be the highest, may be reinforced by metal tubes, such as steel tubes, which provide additional rigidity to the highest stress points of the frame.

Figure 6:
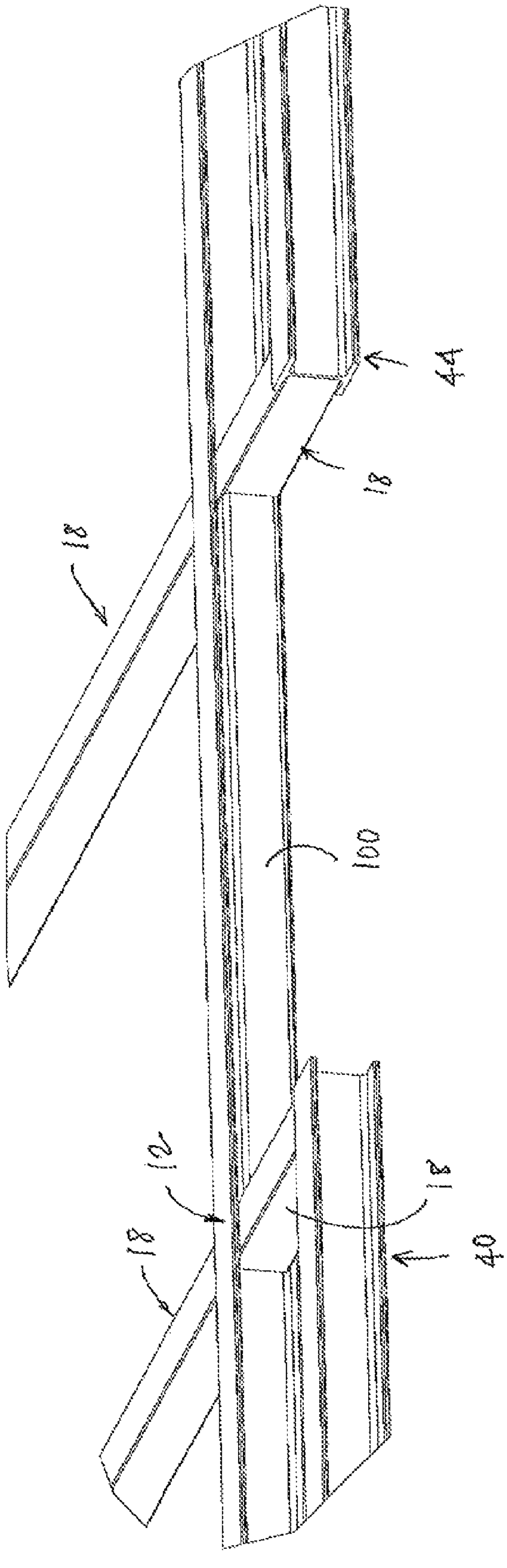
FIG. 6 is an enlarged view of the wheel well portion of the frame.
Figure 7:
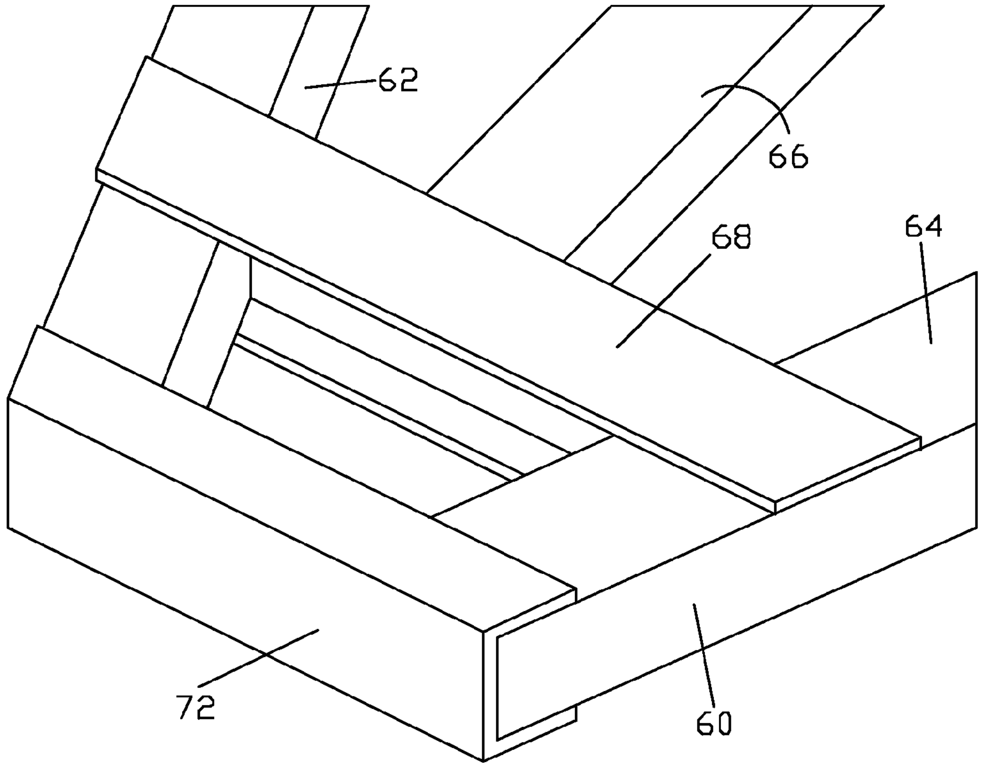
FIG. 7 is an enlarged detailed view of the connections of the hitch frame.

As noted previously, frame 10 is configured with at least one pair of wheel wells for accommodating a pair of wheels. The wheels are mounted to an axle, which is mounted by axle mounts to the longitudinal beams. Referring to FIG. 6, longitudinal beams 12 and 14 may include reinforcement at the wheel well location. For example, longitudinal beams 12 and 14 may include a longitudinal tubular member 100 inserted between their respective flanges and secured therein by an adhesive. These reinforcing beams may extend to the respective transverse beams on either side of the wheel well and, further, secured to the respective transverse beams by an adhesive. In this manner, the wheel well is locally reinforced by these additional tubular members.

Figure 9:
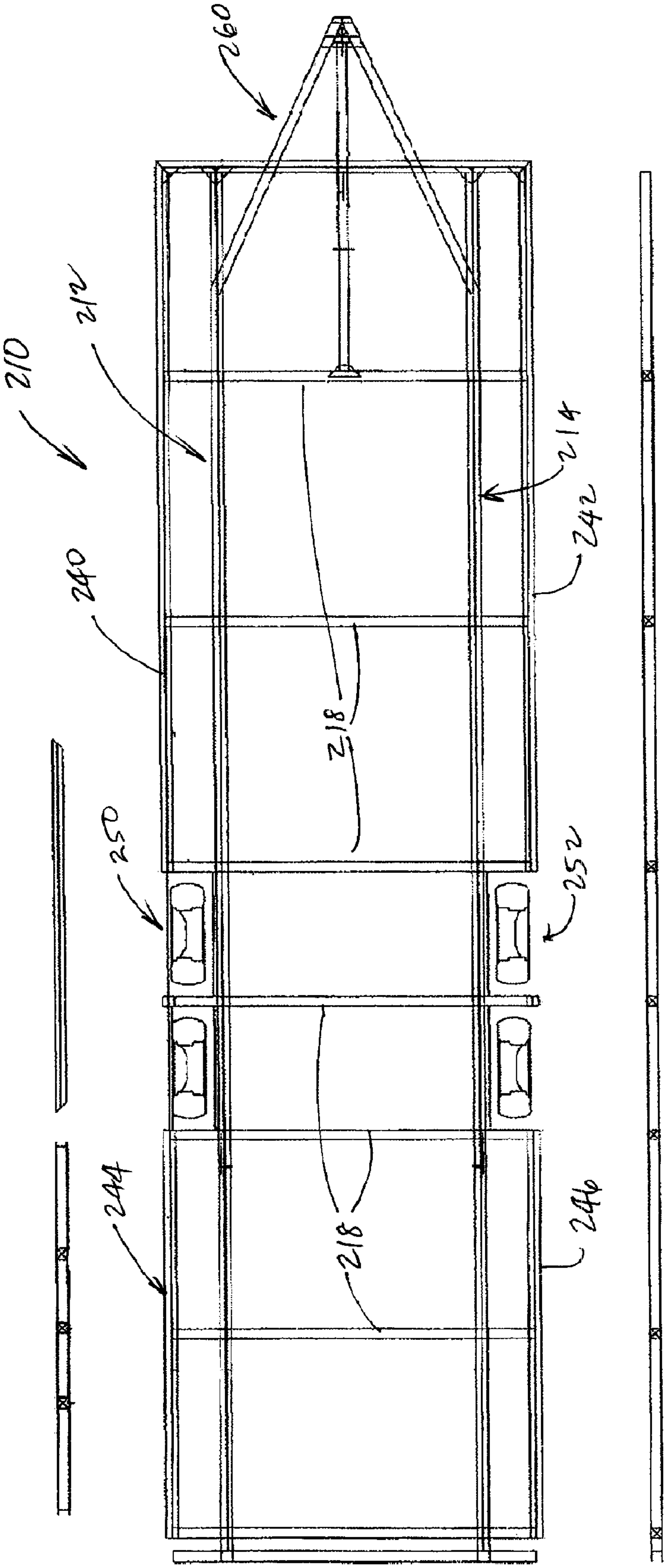
FIG. 9 is a similar view to FIG. 1 of another embodiment illustrated supporting four wheels.

It should also be understood that additional axles may be mounted to the frame and may be mounted adjacent the first axle in the wheel well, providing a large enough wheel well is formed, or may be located in a second wheel well formed by the frame in a similar manner to wheel wells 50 and 52, as shown in FIG. 9.

Referring again to FIG. 3, floor 90 preferably forms generally planar upper and lower surfaces 90*a* and 90*b* and preferably includes no structures projecting below lower surface 90*b* in contrast to most conventional trailer frames, which often include wells for storing components. In addition, any one or more of the polymer beams may form a non-conductive raceway for electrical conductors, such as wires or cables, through the frame. In the illustrated embodiment, transverse beams 20 comprise closed sections and therefore may provide a raceway in the form of a conduit for the electrical conductors, while longitudinal beams, which have open sections, simply form an open raceway along its webs or on the inwardly facing surfaces of their flanges. In this manner, not only do the beams of the frame also form the floor they may provide a means to route electrical conductors through the frame. Further, any of the tubular members may be used as a conduit for routing other components or substances, such as air through the frame.

As would be understood, frame 10 can, therefore, be assembled with no metal components, including fasteners, to provide a corrosion resistant or corrosion free frame, which can significantly add to the longevity of the frame.

In addition to forming a floor, frame 10 may also provide mounting surfaces for side walls, such as side walls of a trailer. As best understood from FIG. 8, the outer longitudinal beams may have a portion of their upper flanges trimmed or the beams may be formed without the outer portion of the upper flange so that the side walls may rest in the frame and rest on the upper surfaces of the lower flanges (40*f*) of the beams. Further, when resting on the upper surfaces of the lower flanges, side walls 100 may be mounted adjacent and optionally abut the webs of the outer longitudinal beams (40, 42, 44, and 46).

Referring to FIG. 9, the numeral 210 designates another embodiment of the frame of the present invention. Frame 210, like frame 10, comprises a wheeled frame with longitudinal beams 212, 214, 240, 242, 244, and 246 and transverse beams 218. For further details of the beams and their construction and arrangement and, further, interconnection, reference is made to frame 10.

In the illustrated embodiment, frame 210 is configured to provide two wheel wells 250 and 252 to accommodate two wheels on each side of the frame. In this embodiment, additional intermediate transverse members are provided to provide a longer frame, with one of the transverse members located in the wheel wells to provide additional stiffness to the frame at the wheel wells. Like frame 10, frame 210 may include additional reinforcing members, such as tubular members, located in the longitudinal beams 212 and 214 that span between the adjacent transverse members in a similar manner to members 100 shown in the previous embodiment.

Figure 11:
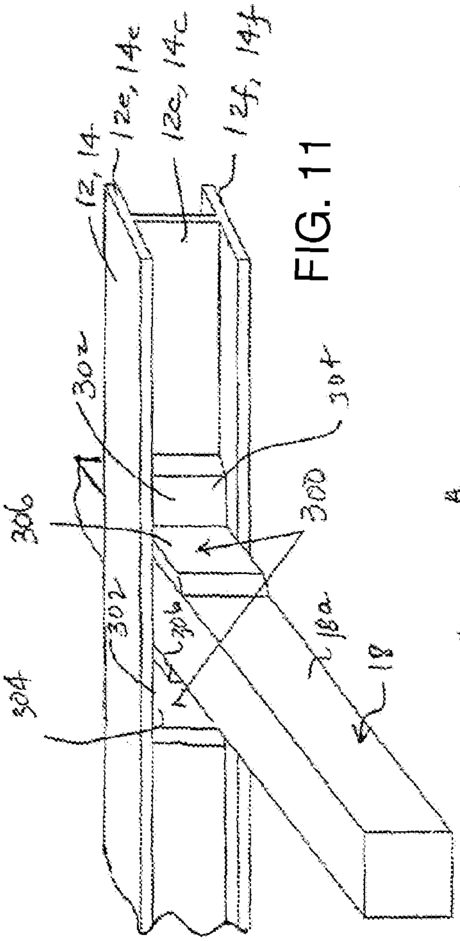
FIG. 11 is an enlarged perspective view of detail A of FIG. 10.
Figure 10:
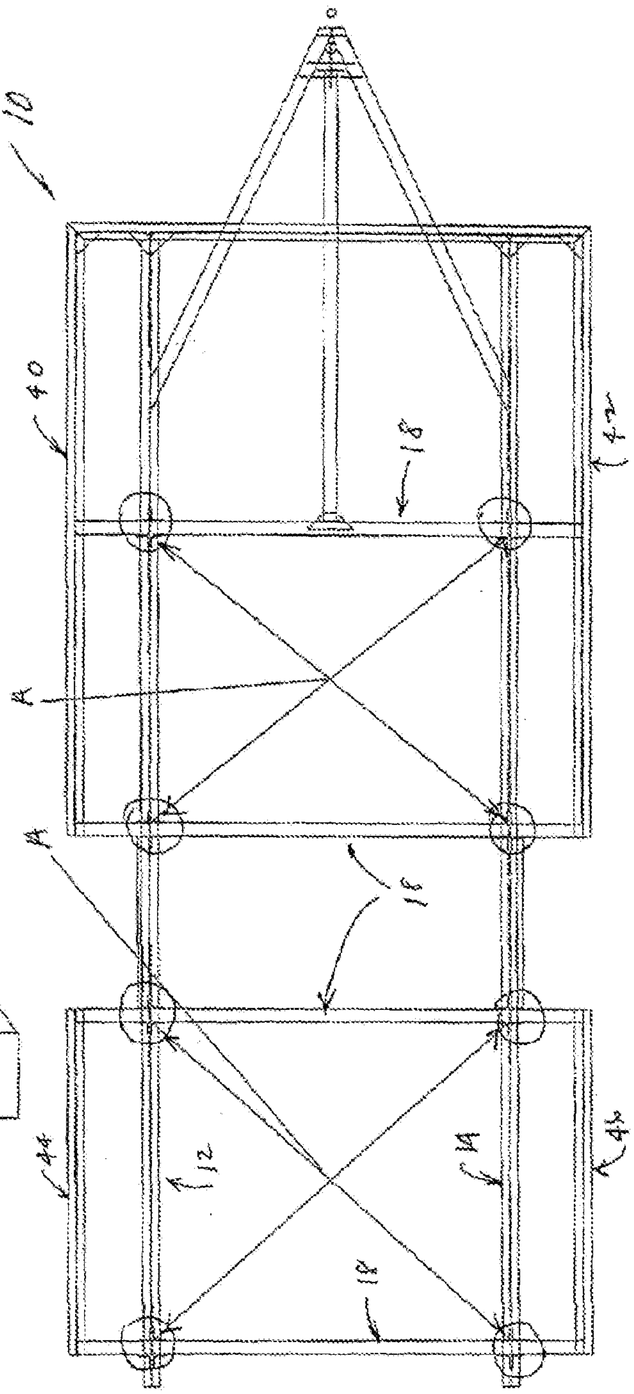
FIG. 10 is a similar view to FIG. 1 illustrating reinforcing members provided at the intersections of the cross-beams and longitudinal beams.

Referring to FIG. 10, frame 10 optionally includes reinforcement at the intersections between cross or transverse beams 18 and longitudinal beams 12 and 14. As best seen in FIG. 11, reinforcing members 300 are provided at each intersection or connection of beams 18 and beams 12 and 14. In the illustrated embodiment, reinforcing members 300 comprise angle members 302 and are located on both sides of each transverse member 18 at their intersection with the webs (12C, 14C) of the respective longitudinal beam (12, 14) and further on both sides of each web (12C, 14C) so that there are four angle members provided at each connection. Further, each reinforcing member 300 is preferably secured in place by welds. For example, legs 304 of angle member 302 may be welded to the webs (12C, 14C) of the longitudinal beams and further preferably extend between the respective flanges (12*e*, 12*f*, 14*e*, 14*f*) of the beams. Optionally, legs 304 may also be welded to the underside of the flanges. Legs 306 are similarly welded to side walls 18*a* of beams 18 and, further, optionally to the respective flanges of the longitudinal beams at their juncture with legs 304.

Though illustrated and described as an angle member, the reinforcing members may be formed from other structural members, such as tubular members, channel members, or separate gusset plates, all optionally formed from pultruded polyurethane, including reinforced polyurethane, similar to the beams forming frame 10. Further, reinforcing members 300 may also be used on frame 210.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property right or privilege is claimed are defined as follow:

1. A chassis frame comprising:

first and second longitudinal polymer beams oriented generally parallel to and spaced apart from a central axis, each of said beams having a vertically oriented web facing said central axis and having forward and rearward ends;

a plurality of transverse polymer beams, said transverse beams being spaced apart and being generally orthogonal to said central axis, at least one of said transverse polymer beams extending through said webs of said longitudinal polymer beams and being secured to said longitudinal polymer beams at said webs; and a hitch frame extending from a forward beam of said transverse polymer beam for mounting a towing hitch to said frame.

2. The transport frame according to claim 1, wherein each beam of said transverse polymer beams comprises a tubular beam.

3. The transport frame according to claim 1, further comprising a plurality of decking members, said polymer beams cooperating with said decking members to form a floor with said decking members.

4. The transport frame according to claim 1, wherein said polymer beams are arranged to form a pair of opposed wheel wells and at least two of said polymer beams providing a mounting surface for axle mounts.

5. The transport frame according to claim 1, wherein said hitch frame comprises a plurality of polymer beams.

6. The transport frame according to claim 1, wherein at least one of said polymer beams is reinforced by a metal member.

7. The chassis frame according to claim 1, further comprising an adhesive securing said at least one transverse polymer beam at said webs.

8. The chassis frame according to claim 1, wherein each of said transverse polymer beams having an outer dimension, each of said webs having transverse openings with an inner dimension greater than said outer dimensions of said at least one transverse polymer beam wherein said transverse openings provide gaps between said at least one transverse polymer beam and said webs, and said adhesive being located in said gaps for securing said at least one transverse polymer beam to said webs at said transverse openings.

9. The chassis frame according to claim 1, wherein said forward beam includes a web facing said other transverse polymer beams, said hitch frame including two angled beams extending through said web of said forward beam.

10. A frame comprising:

a pair of longitudinal beams oriented generally parallel to and spaced apart from a central axis, each of said longitudinal beams having a vertically oriented web facing said central axis, and each of said beams having forward and rearward ends;

a plurality of transverse beams, said transverse beams being spaced apart and being generally orthogonal to said central axis, said transverse beams extending through said webs of said first pair of longitudinal beams and being secured to said pair of longitudinal beams in said webs of said pair of longitudinal beams; and wherein said longitudinal beams or said transverse beams comprise polymer beams.

11. The frame according to claim 10, wherein said transverse beams and said longitudinal beams comprise polymer beams.

12. The frame according to claim 10, further comprising a hitch frame extending from a forward beam of said transverse beams for mounting a towing hitch to said frame.

13. The frame according to claim 12, wherein said hitch frame comprise polymer beams.

14. The frame according to claim 12, wherein said forward beam includes a web facing said other transverse beams, said hitch frame including two beams extending through said web of said forward beam.

15. The frame according to claim 10, wherein said longitudinal beams provide mounting surfaces for axle mounts.

16. A method of making a frame comprising:

providing a plurality of polymer beams;

providing openings in a first group of the beams;

extending a second group of the beams through the openings of first group of beams; and adhering the first group of beams to the second group of beams at the openings.

* * * * *

UNITED STATES PATENT AND TRADEMARK OFFICE

CERTIFICATE OF CORRECTION

PATENT NO. : 8,235,421 B2
APPLICATION NO. : 12/915612
DATED : August 7, 2012
INVENTOR(S) : Phillip J. Biscan It is certified that error appears in the above-identified patent and that said Letters Patent is hereby corrected as shown below:

Title page, item (76) inventor: Delete "Philip Biscan" and insert -- Phillip J. Biscan --.

Signed and Sealed this
Seventeenth Day of November, 2015

Michelle K. Lee

Michelle K. Lee
*Director of the United States Patent and Trademark Office*